(12) United States Patent
Fujisato

(10) Patent No.: US 10,857,506 B2
(45) Date of Patent: Dec. 8, 2020

(54) GAS DISSOLUTION ACCELERATING DEVICE

(71) Applicant: BUBBLETANK CO., LTD., Yamaguchi (JP)

(72) Inventor: Tetsuhiko Fujisato, Yamaguchi (JP)

(73) Assignee: BUBBLETANK CO., LTD., Yamaguchi (JP)

( * ) Notice: Subject to any disclaimer, the term of this patent is extended or adjusted under 35 U.S.C. 154(b) by 0 days.

(21) Appl. No.: 16/695,319

(22) Filed: Nov. 26, 2019

(65) Prior Publication Data

US 2020/0094199 A1 Mar. 26, 2020

Related U.S. Application Data

(63) Continuation of application No. PCT/JP2018/020420, filed on May 28, 2018.

(51) Int. Cl.
*B01F 3/04* (2006.01)
*C02F 1/74* (2006.01)
*C02F 103/00* (2006.01)

(52) U.S. Cl.
CPC ...... *B01F 3/04241* (2013.01); *B01F 3/04106* (2013.01); *B01F 3/04269* (2013.01);
(Continued)

(58) Field of Classification Search
CPC .......... C02F 1/74; B01F 3/04; B01F 3/04106; B01F 2003/04184; B01F 3/04241; B01F 3/04269
(Continued)

(56) References Cited

U.S. PATENT DOCUMENTS 9,358,505 B2 * 6/2016 Cumin ................ B01D 65/08
2011/0004009 A1 1/2011 Itoh et al.
2015/0352505 A1 12/2015 Yokota et al.

FOREIGN PATENT DOCUMENTS

JP S51-046671 B2 12/1976
JP S57-035926 A 2/1982
(Continued)

OTHER PUBLICATIONS

International Search Report issued in PCT/JP2018/020420 dated Aug. 7, 2018 with English Translation (5 pages).
(Continued)

*Primary Examiner* — Robert A Hopkins
(74) *Attorney, Agent, or Firm* — Nakanishi IP Associates, LLC

(57) ABSTRACT

A gas dissolution accelerating device with a simple structure efficiently increases the concentrations of oxygen dissolved in deep water, such as at lake bottoms. A gas dissolution accelerating device includes a cylindrical member located parallel to a vertical direction when installed, a box member having an opening facing downward when installed, and a fixing unit for fixing the box member to a diffuser. The box member includes a top plate having a cone-shaped protrusion protruding inward and a through-hole receiving the cylindrical member. The fixing unit includes a flat attachment plate having an upper surface onto which the box member is mounted, a pair of halved banding members for clamping a feeding pipe of the diffuser, and rod-shaped connecting members connecting the attachment plate to the banding members.

13 Claims, 5 Drawing Sheets

(52) U.S. Cl.
CPC ....... *C02F 1/74* (2013.01); *B01F 2003/04411* (2013.01); *B01F 2003/04872* (2013.01); *B01F 2215/0052* (2013.01); *C02F 2103/007* (2013.01)

(58) Field of Classification Search
USPC ...................................... 261/121.1, 123, 126
See application file for complete search history.

(56) References Cited

FOREIGN PATENT DOCUMENTS

| | | |
|---|---|---|
| JP | S62-056197 U | 4/1987 |
| JP | S63-136798 U | 9/1988 |
| JP | H4-137701 U | 12/1992 |
| JP | H7-039893 A | 2/1995 |
| JP | H7-256292 A | 10/1995 |
| JP | H10-263582 A | 10/1998 |
| JP | H11-179394 A | 7/1999 |
| JP | 2009-235060 A | 10/2009 |
| JP | 2013-545604 A | 12/2013 |
| WO | 2014/119775 A1 | 8/2014 |

OTHER PUBLICATIONS

International Search Report issued in PCT/JP2018/020420 dated Aug. 7, 2018 (3 pages).
Written Opinion of International Searching Authority issued in PCT/JP2018/020420 dated Aug. 7, 2018 (5 pages).
International Preliminary Report on Patentability (PCT Chapter II) issued in PCT/JP2018/020420 dated Jul. 29, 2019 (4 pages).

\* cited by examiner

GAS DISSOLUTION ACCELERATING DEVICE

CROSS-REFERENCE TO RELATED APPLICATIONS

This application is a continuation application of International Patent Application No. PCT/JP2018/020420 filed on May 28, 2018, the entire content of which is incorporated by reference.

BACKGROUND OF INVENTION

Field of the Invention

The present invention relates to a gas dissolution accelerating device used in combination with a diffuser that is installed mainly at a lake, an aquafarm, or a sewage plant to increase the concentration of a target gas dissolved in a liquid. In particular, the invention relates to a gas dissolution accelerating device with a simple structure that drastically increases the concentration of a target gas dissolved in a liquid.

Background Art

To increase the concentrations of oxygen dissolved in water at lakes or other places, diffusers may be installed, for example, at the bottoms of lakes to release air into water. However, simply supplying air into water has a limited effect of increasing the concentrations of oxygen dissolved in water.

In response to this, for example, Patent Literature 1 entitled SEWAGE TREATMENT DIFFUSER describes a diffuser that can greatly increase the dissolved oxygen concentrations at sewage treatment facilities or sanitation facilities.

The structure described in Patent Literature 1 includes a strip plate twisted about the centerline in the plate-width direction and having cutouts located at predetermined intervals in the longitudinal direction and extending in the plate-width direction, a mixing pipe containing the strip plate, and an air pipe located at the lower end of the mixing pipe.

When air is supplied from the air pipe to the mixing pipe in this sewage treatment diffuser, the air entrains the surrounding sewage into the mixing pipe, through which the air and the sewage mix while being stirred along the plate. This structure thus increases the dissolved oxygen in the sewage.

The structure described in Patent Literature 2 entitled GAS-LIQUID CONTACTOR is simple and improves the efficiency of oxygen dissolution.

The structure described in Patent Literature 2 includes a reaction tank containing a diffuser in its lower portion and a baffle located with a clearance from the tank wall and thus located near the liquid level in the tank to allow air bubbles ascending in a liquid to collide with the baffle.

This structure allows air bubbles ascending in the liquid to burst at the baffle and disperse along the lower surface of the baffle to the side plates until escaping through the clearance between the baffle and the tank wall into the atmosphere. Thus, the air bubbles remain in contact with the liquid in the tank for an extended period of time with an increased area of contact, improving the efficiency of oxygen dissolution in the liquid in the reaction tank.

CITATION LIST

Patent Literature

Patent Literature 1: Japanese Unexamined Patent Application Publication No. 7-39893
Patent Literature 2: Japanese Unexamined Patent Application Publication No. 10-263582

In deep water at the bottoms of lakes, for example, aquatic organisms consume oxygen dissolved in water. This increases the ratio of gases other than oxygen dissolved in water. Such gases have higher partial pressures at greater depths of water. At greater depths of water as described above, the diffusers described in Patent Literatures 1 and 2, which are installed in water to simply generate air bubbles containing oxygen, cannot increase dissolved oxygen sufficiently by exchanging gases other than oxygen dissolved in water with oxygen.

SUMMARY OF INVENTION

In response to the above issue, one or more aspects of the present invention are directed to a gas dissolution accelerating device with a simple structure that can efficiently increase the concentrations of oxygen dissolved in deep water, such as at the bottoms of lakes.

A gas dissolution accelerating device according to one or more aspects of the present invention is to be installed above a diffuser and includes a box member having an opening facing downward when installed and including a top plate with a through-hole, and a cylindrical member located parallel to a vertical direction when installed. The cylindrical member is received in the through-hole with a length extending downward from the top plate falling within a depth of the box member.

In the gas dissolution accelerating device with the above structure, many fine air bubbles generated by the diffuser ascend while entraining the surrounding liquid, and are trapped in the box member. The trapped air bubbles are clustered at the uppermost area of the liquid inside the box member to form liquid bubbles. In contrast, air bubbles reaching the lower end of the cylindrical member are not trapped in the box member but ascend through the cylindrical member while being clustered, and overflow through the upper end. The gas supplied as air bubbles forms a gas phase inside an upper space of the box member. The liquid bubbles are then exposed to the gas and burst in the gas phase.

The gas phase inside the box member gradually expands as the gas in the form of air bubbles is continuously supplied from the diffuser. However, the gas can no longer fill the box member when the interface between the gas phase and the liquid phase forms at the lower end of the cylindrical member. When air bubbles continue to be supplied to the box member, the air bubbles turn into liquid bubbles and burst in the gas phase. The excess gas from the gas phase again turns into air bubbles, which flow into the cylindrical member through the lower end.

The gas in the box member receives the water pressure at the depth of water. The gas components are then exchanged with the gas in the liquid films of the liquid bubbles under their respective partial pressures. When the liquid films lack sufficient oxygen, for example, oxygen inside and outside the liquid bubbles is absorbed into the liquid films, forcing other gases in the same amount as the absorbed oxygen to release from the liquid films. In the aspect of the present invention, the gas supplied from the diffuser comes in contact with the liquid films in the box member to accelerate dissolution of the gas in the liquid forming the liquid films.

A gas dissolution accelerating device according to one or more aspects of the present invention is the gas dissolution accelerating device according to the first aspect in which the box member has, at a position excluding the through-hole in the top plate, a cone-shaped protrusion that smoothly protrudes inward, and has a height falling within the length of the cylindrical member extending downward from the top plate.

In the gas dissolution accelerating device with the above structure, liquid bubbles formed by air bubbles collide with the tip of the protrusion and burst. The liquid in the liquid films ascends while spreading along the side surface of the cone-shaped protrusion again into thin liquid films. These liquid films also absorb gas components in the gas in the gas phase under their respective partial pressures, thus forcing excess gas components dissolved in the liquid films to be released outside.

A gas dissolution accelerating device according to one or more aspects of the present invention is the gas dissolution accelerating device according to the second aspect that includes a first box member and a second box member each having the same structure as the box member described above and each including the cylindrical member and the protrusion. The second box member is located below the first box member with an upper end of an opening of the cylindrical member located immediately below a tip of the protrusion in the first box member.

In the above structure, clustered air bubbles ascending through the cylindrical member located at the second box member forcefully overflow the cylindrical member through the upper end, and collide with the tip of the protrusion in the first box member while entraining a large amount of surrounding liquid and burst again into larger, thin liquid films. The cylindrical member located at the second box member gathers air bubbles reaching its lower end and directs such air bubbles immediately below the tip of the protrusion in the first box member.

In the above aspect of the present invention, air bubbles reaching the gas phase form liquid bubbles in the second box member, in addition to the first box member. The liquid bubbles then collide with the tip of the protrusion and burst to form thin liquid films along the side surface of the protrusion. Additionally, more liquid bubbles densely collide with the tip of the protrusion in the first box member than in the structure according to the second aspect. The larger liquid films form after the burst of the liquid bubbles than in the second aspect of the present invention. The structure according to the third aspect thus further accelerates the dissolution of the gas supplied from the diffuser into the liquid films, enhancing the effect of the first aspect.

A gas dissolution accelerating device according to one or more aspects of the present invention is the gas dissolution accelerating device according to the third aspect in which the cylindrical member located at the second box member is received in the through-hole with the upper end protruding upward from the top plate.

In the gas dissolution accelerating device with the above structure, the upper end of the cylindrical member located at the second box member is nearer the tip of the protrusion in the first box member than the cylindrical member according to the third aspect. The cylindrical member located at the second box member thus more reliably gathers air bubbles reaching the lower end and directs such air bubbles immediately below the tip of the protrusion in the first box member.

A gas dissolution accelerating device according to one or more aspects of the present invention is the gas dissolution accelerating device according to the fourth aspect in which the cylindrical member located at the second box member is received in the through-hole in the top plate with the upper end located below a lower end of the cylindrical member located at the first box member.

When the upper end of the cylindrical member located at the second box member is placed in the gas phase inside the first box member, air bubbles fed through the upper end of the cylindrical member entrain less liquid. The liquid bubbles formed by such air bubbles are thus less likely to form larger liquid films after colliding with the tip of the protrusion and bursting. In contrast, the above structure includes the second box member including the cylindrical member with the upper end located below the interface between the gas phase and the liquid phase at the level of the lower end of the cylindrical member when no more gas can be stored in the first box member. The cylindrical member located at the second box member thus has the upper end located in the liquid phase of the first box member.

More specifically, the structure according to the above aspect of the present invention allows air bubbles overflowing the cylindrical member located at the second box member through the upper end to forcefully ascend in the liquid phase while entraining a large amount of surrounding liquid. The air bubbles then form liquid bubbles and forcefully collide with the tip of the protrusion in the first box member to form larger, thin liquid films along the side surface of the cone-shaped protrusion.

A gas dissolution accelerating device according to one or more aspects of the present invention is the gas dissolution accelerating device according to any one of the third to fifth aspects further including rod-shaped connectors. The first box member and the second box member each have holders on side plates opposing each other, and each of the holders receives an upper end of one of the connectors and/or a lower end of another one of the connectors.

The gas dissolution accelerating device with the above structure includes the first box member and the second box member that are stacked vertically and connected to each other with the connectors in the holders, in addition to the effect of any one of the third to fifth aspects.

A gas dissolution accelerating device according to one or more aspects of the present invention is the gas dissolution accelerating device according to any one of the third to sixth aspects in which the cylindrical member located at the second box member has a slit with an intended width on a side surface and received in the through-hole in the top plate with an uppermost end of the slit located below a tip of the protrusion in the second box member.

When a large amount of air bubbles is supplied from the diffuser to the second box member, the cylindrical member with an inlet for the air bubbles at the lower end alone can cause the air bubbles trapped in the second box member to intensely agitate up and down the interface between the gas phase and the liquid phase in the second box member. This prevents smooth flow of air bubbles into the cylindrical member, and causes the air bubbles to intermittently overflow the cylindrical member through the upper end. In this case, liquid bubbles formed by such air bubbles do not collide with the tip of the protrusion continuously, possibly preventing formation of larger, thin liquid films.

In contrast, the structure according to the above aspect includes the cylindrical member located at the second box member with slits on the side surface. This structure allows fine air bubbles to flow into the cylindrical member through the slits, and allows large air bubbles that cannot pass through the slits to flow into the cylindrical member through the lower end. In this structure, the interface between the gas phase and the liquid phase described above is less likely to be agitated up and down, thus allowing smooth flow of air bubbles into the cylindrical member through the lower end or through the slits. The air bubbles continuously overflowing the cylindrical member through the upper end then form liquid bubbles and collide with the tip of the protrusion in the first box member.

In the structure according to the above aspect, air bubbles excessively supplied from the diffuser to the second box member are less likely to intensely agitate up and down the interface between the gas phase and the liquid phase in the second box member. In addition to the effect of any one of the third to sixth aspects, this structure thus allows air bubbles to smoothly flow into the cylindrical member and continuously overflow the cylindrical member through the upper end to form liquid bubbles and constantly collide with the tip of the protrusion in the first box member.

As described above, the gas dissolution accelerating device according to the first aspect is located above the diffuser that may be installed in deep water such as at the bottoms of lakes, and thus accelerates dissolution of the gas supplied from the diffuser and efficiently increases the concentrations of the gas dissolved in the liquid.

The gas dissolution accelerating device according to the second aspect allows the gas components in the gas in the gas phase to dissolve, under their respective partial pressures, in the thin liquid films that form along the side surface of the cone-shaped protrusion after the liquid bubbles burst in the gas phase of the box member, in the same manner as in the liquid films of the liquid bubbles. The above structure thus more efficiently increases the concentrations of the gas from the diffuser to dissolve in the liquid, further enhancing the effect of the first aspect.

The gas dissolution accelerating device according to the third aspect allows air bubbles reaching the gas phase to form liquid bubbles and collide with the tip of the protrusion and burst to form thin liquid films in the second box member, in the same manner as in the first box member according to the second aspect of the present invention, and further allows the air bubbles in the first box member to overflow the cylindrical member located at the second box member through the upper end and densely collide with the tip of the protrusion and burst to form larger, thin liquid films along the side surface of the protrusion. The gas dissolution accelerating device according to the above aspect allows the gas components in the gas in the gas phase to dissolve in the liquid under their respective partial pressures in the first box member and the second box member. This structure further increases the concentrations of the gas from the diffuser to dissolve in the liquid, further enhancing the effect of the first aspect.

The gas dissolution accelerating device according to the fourth aspect accurately directs air bubbles reaching the lower end of the cylindrical member located at the second box member immediately below the tip of the protrusion in the first box member through the cylindrical member, and allows the gas components in the gas in the gas phase of the first box member to dissolve in the liquid films that form after the liquid bubbles collide with the protrusion. This structure thus efficiently increases the concentrations of the gas dissolved in the liquid, further enhancing the effect of the third aspect.

The gas dissolution accelerating device according to the fifth aspect allows air bubbles to overflow the cylindrical member through the upper end in the gas phase of the second box member and forcefully collide with the tip of the protrusion in the first box member, without decelerating while ascending. This forms larger, thin liquid films along the side surface of the cone-shaped protrusion. This structure allows the gas components in the gas phase to dissolve in the liquid films, and efficiently increases the concentrations of the gas components dissolved in the liquid, further enhancing the effect of the fourth aspect.

The gas dissolution accelerating device according to the sixth aspect includes the first box member and the second box member that are installed in a stable manner, in addition to the effect of any one of the third to fifth aspects.

The gas dissolution accelerating device according to the seventh aspect allows larger, thin liquid films to form easily along the side surface of the protrusion in the first box member when air bubbles are excessively supplied from the diffuser to the second box member and liquid bubbles formed by such air bubbles overflowing the cylindrical member located at the second box member through the upper end collide with the protrusion in the first box member and burst. This structure further accelerates the dissolution of the gas supplied from the diffuser in the liquid and more efficiently increases the concentrations of the gas dissolved in the liquid, in addition to the effect of any one of the third to sixth aspects.

DETAILED DESCRIPTION

A gas dissolution accelerating device according to embodiments of the present invention will be described in detail with reference to FIGS. 1 to 5. The gas dissolution accelerating device according to one or more embodiments of the present invention is installed for use above a diffuser in a liquid to be treated. The gas dissolution accelerating device will thus be hereafter described using directional terms including an upper end and a lower end, based on an actual use of the gas dissolution accelerating device with a box member open downward and cylindrical members parallel to the vertical direction. A liquid to be treated may be other than water. Thus, liquid bubbles and liquid films are used rather than water bubbles and water films.

First Embodiment

Figure 1:
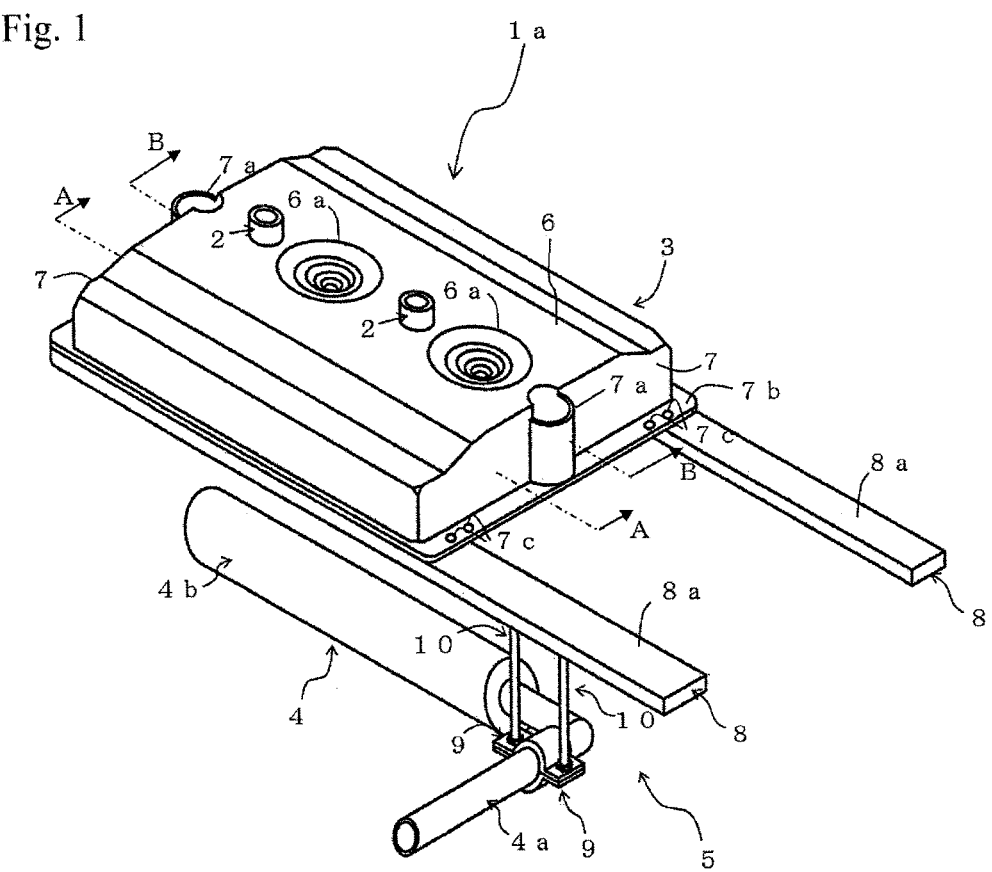
FIG. 1 is an external perspective view of a gas dissolution accelerating device according to a first embodiment of the present invention.
Figure 2A:
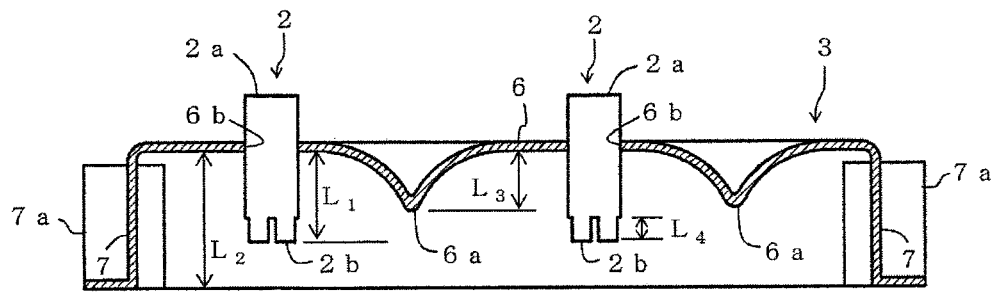
FIG. 2A is a cross-sectional view taken along line A-A in FIG. 1.
Figure 2B:
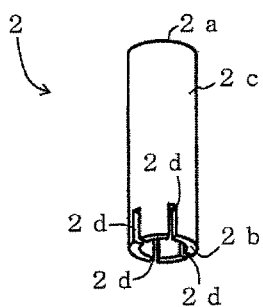
FIG. 2B is an enlarged external perspective view of a cylindrical member.
Figure 2C:
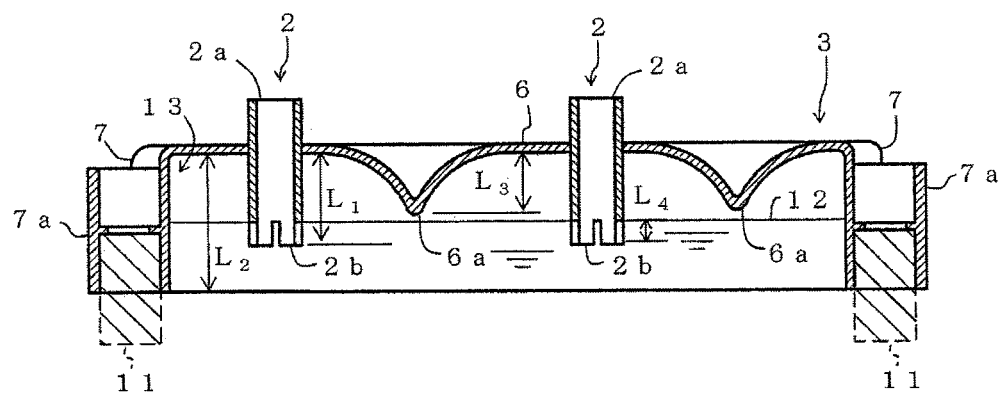
FIG. 2C is a cross-sectional view taken along line B-B in FIG. 1.

FIG. 1 is an example external perspective view of a gas dissolution accelerating device according to an embodiment of the present invention. FIGS. 2A and 2C are cross-sectional views respectively taken along lines A-A and B-B in FIG. 1. FIG. 2B is an enlarged external perspective view of a cylindrical member. FIG. 2C is a view of a box member in FIG. 2A that is installed in water. In FIGS. 2A and 2C, a diffuser and a fixing unit are not shown. In FIG. 2C, connectors are indicated by dashed lines for describing the structure of the holders on the side plates of the box member.

Figure 3A:
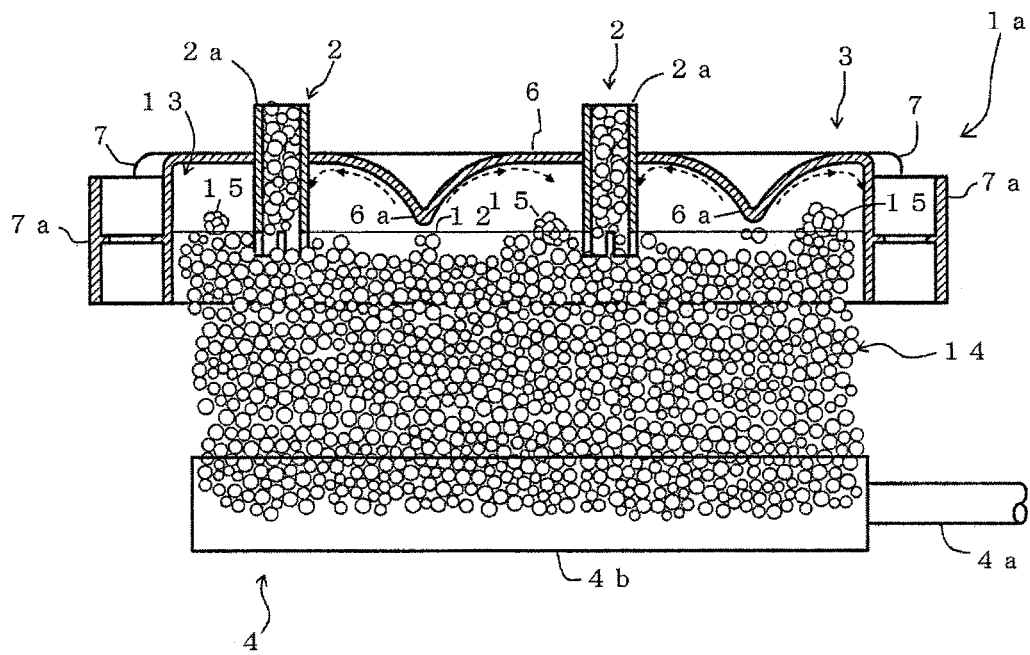
FIG. 3A is a diagram describing the movement of air bubbles in FIG. 2B.
Figure 3B:
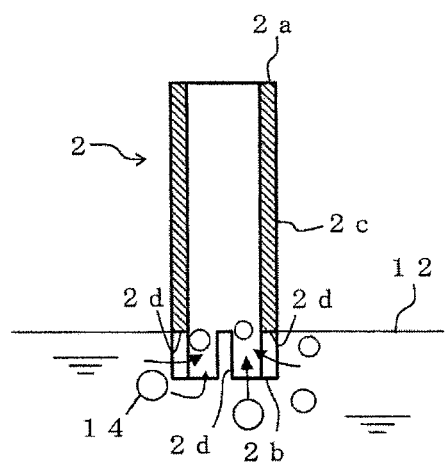
FIG. 3B is an enlarged view of the cylindrical member shown in FIG. 3A.

FIGS. 3A and 3B are diagrams describing the movement of air bubbles supplied from the diffuser into the cylindrical members. FIG. 3A shows the diffuser located below the box member in FIG. 2B, and FIG. 3B is an enlarged view of the cylindrical member in FIG. 3A. In FIG. 3A, a fixing unit is not shown.

As shown in FIGS. 1 to 2C, a gas dissolution accelerating device 1a includes cylindrical members 2 installed to be parallel to the vertical direction, a box member 3 having an opening facing downward, and a fixing unit 5 for fixing the box member 3 to a diffuser 4. The term being parallel to or to be parallel to the vertical direction in embodiments and aspects of the present invention includes being substantially parallel to the vertical direction.

The box member 3 includes a top plate 6 having cone-shaped protrusions 6a that smoothly protrude inward. The top plate 6 has through-holes 6b (refer to FIG. 2A) in flat areas excluding the protrusions 6a. The cylindrical members 2 are received in the through-holes 6b perpendicularly to the top plate 6 and fixed to the box member 3. The box member 3 also includes a pair of side plates 7 parallel to each other. The side plates 7 include holders 7a at opposing positions for each receiving an upper end or a lower end of a rod-shaped connector 11 (refer to FIG. 2C).

For example, two box members 3 stacked vertically may be connected to each other with such connectors 11 each having an upper end held by an upper holder 7a and a lower end held by a lower holder 7a facing the upper holder 7a. The box members 3 in the gas dissolution accelerating device 1a include the holders 7a to connect multiple box members 3 installed vertically with the connectors 11 in a stable manner.

The diffuser 4 includes a gas source (not shown) such as a blower, a feeding pipe 4a with one end connected to the gas source, and a porous diffusing cylinder 4b connected to the other end of the feeding pipe 4a. Air is supplied from the air source to the porous diffusing cylinder 4b through the feeding pipe 4a.

The fixing unit 5 includes a flat attachment plate 8 having an upper surface 8a onto which the box member 3 is to be mounted, a pair of halved banding members 9 for clamping the feeding pipe 4a, and rod-shaped connecting members 10 for connecting the attachment plate 8 to the banding members 9.

The banding member 9 includes a semicircular clamping portion curved along the outer circumference of the feeding pipe 4a and attachment portions extending outward from the ends of the clamping portion in the radial direction of the feeding pipe 4a. The attachment portions each have a bolt hole. The banding members 9 are fastened to the feeding pipe 4a with bolts received in the bolt holes in the attachment portions.

The side plates 7 of the box member 3 each have an edge 7b bent outward at a right angle. The edge 7b has screw holes 7c to receive screws to fasten the box member 3 to the attachment plate 8.

As shown in FIGS. 2A to 2C, each cylindrical member 2 is received in the through-hole 6b in the top plate 6 to have an upper end 2a protruding upward from the top plate 6. The cylindrical member 2 has a length $L_1$ extending downward from the top plate 6 shorter than a depth $L_2$ of the box member 3 and longer than a height $L_3$ of the protrusion 6a. More specifically, the cylindrical member 2 received in the through-hole 6b has the length $L_1$ extending downward from the top plate 6 falling within the depth $L_2$ of the box member 3. The protrusion 6a has the height $L_3$ falling within the length $L_1$ of the cylindrical member 2 extending downward from the top plate 6.

The cylindrical member 2 has four slits 2d on a side surface 2c. The slits 2d are equiangularly spaced along the circumference each with an intended width and a length $L_4$ from a lower end 2b. The relationship among the length $L_4$ of the slit 2d, the length $L_1$ of the cylindrical member 2 extending downward from the top plate 6, and the height $L_3$ of the protrusion 6a is expressed by the formula (1) below. In other words, the cylindrical member 2 is received in the through-hole 6b in the top plate 6 with the uppermost ends of the slits 2d (points away from the lower end 2b by the length $L_4$) located below the tip of the protrusion 6a. The cylindrical member 2 may have any number of slits 2d with any width, other than the examples described in the present embodiment.

$$L_4 < L_1 - L_3 \qquad \text{Formula 1}$$

The gas dissolution accelerating device 1a shown in FIG. 1 is installed in water at a lake or another place to have the top plate 6 of the box member 3 substantially horizontal. When gas such as oxygen or air is supplied to the diffuser 4 with a blower, for example, many air bubbles form through the porous diffusing cylinder 4b.

The air bubbles are trapped in the box member 3 located above the diffuser 4, and form a gas phase 13 above an interface at the level of the uppermost ends of slits 2d in the box member 3. The interface between the gas phase 13 and the liquid phase in the box member 3 is hereafter simply referred to as an interface 12.

As shown in FIG. 3A, many fine air bubbles 14 generated by the diffuser 4 ascend while entraining the surrounding water, and then are trapped in the box member 3. However, air bubbles 14 reaching the lower end 2b of the cylindrical member 2 are not trapped in the box member 3 but ascend through the cylindrical member 2 while being clustered, and then overflow through an upper end 2a.

The air bubbles 14 trapped in the box member 3 burst at the uppermost area of the water inside the box member 3 and enter the gas phase 13. The clustered air bubbles 14 reach the gas phase 13 and form liquid bubbles 15, and then are exposed to the gas and burst in the gas phase 13.

The air bubbles 14 continuously supplied to the box member 3 from the diffuser 4 gradually expand the space defining the gas phase 13. This lowers the level of the interface 12. The box member 3 can store a limited amount of gas. Once the interface 12 reaches the level of the uppermost ends of slits 2d on the cylindrical member 2, air bubbles 14 freshly supplied to the box member 3 form liquid bubbles and burst in the gas phase 13, but cannot remain in the gas phase 13. The excess gas re-forms air bubbles 14 and flows into the cylindrical member 2 through the lower end 2b.

The gas thus stored in the box member 3 receives the water pressure at the depth of the water. The gas components in the gas are absorbed in the liquid films of the liquid bubbles 15 under their respective partial pressures, and then excess gas components dissolved in the liquid films are released outside. When the liquid films lack sufficient oxygen, for example, oxygen inside and outside the liquid bubbles 15 is absorbed in the liquid films, and other gases are released from the liquid films in the same amount as the oxygen absorbed.

More specifically, the gas dissolution accelerating device 1a is installed in deep water, such as at the bottom of a lake, and oxygen or air is supplied from the diffuser 4 to the box member 3. The gas stored in the box member 3 receives the water pressure at the depth of the water. The water in such a place may contain gases other than oxygen with increased concentrations from aquatic organisms consuming the oxygen dissolved in the water. However, the other gases dissolved in the liquid films of the liquid bubbles 15 are exchanged with oxygen under their respective partial pressures as described above. The gas dissolution accelerating device 1a located above the diffuser 4, which may be installed in deep water, can accelerate oxygen dissolution in water to efficiently increase the dissolved oxygen concentrations.

Air bubbles 14 entraining the surrounding water ascend to the gas phase 13 to form liquid bubbles, which collide with the tips of the protrusions 6a and burst. The liquid in the liquid films of the liquid bubbles 15 ascends while spreading along the side surfaces of the cone-shaped protrusions 6a, as indicated by the dashed arrows, and re-form larger, thin liquid films. Similarly to the liquid films of the liquid bubbles 15, these larger, thin liquid films also absorb gas components in the gas in the gas phase 13 under their respective partial pressures, and then excess gas components dissolved in the liquid films are released outside. This structure further increases the concentrations of oxygen dissolved in water.

The gas supplied from the diffuser 4 to the box member 3 in the form of air bubbles 14 may exceed the amount of gas storable in the box member 3. In this case, the cylindrical member 2 with an inlet for air bubbles 14 at the lower end 2b alone can cause the air bubbles 14 trapped in the box member 3 to intensely agitate the interface 12 up and down. This may prevent smooth flow of the air bubbles 14 into the cylindrical member 2, and cause the air bubbles 14 to intermittently overflow the cylindrical member 2 through the upper end 2a.

In contrast, the gas dissolution accelerating device 1a includes the cylindrical member 2 with slits 2d on the side surface. This structure allows, as indicated by the solid arrows in FIG. 3B, fine air bubbles 14 to flow into the cylindrical member 2 through the slits 2d, and large air bubbles 14 that cannot pass through the slits 2d to flow into the cylindrical member 2 through the lower end 2b. The gas dissolution accelerating device 1a thus allows air bubbles 14 to smoothly flow into the cylindrical member 2, and to continuously overflow the cylindrical member 2 through the upper end 2a.

Second Embodiment

Figure 4A:
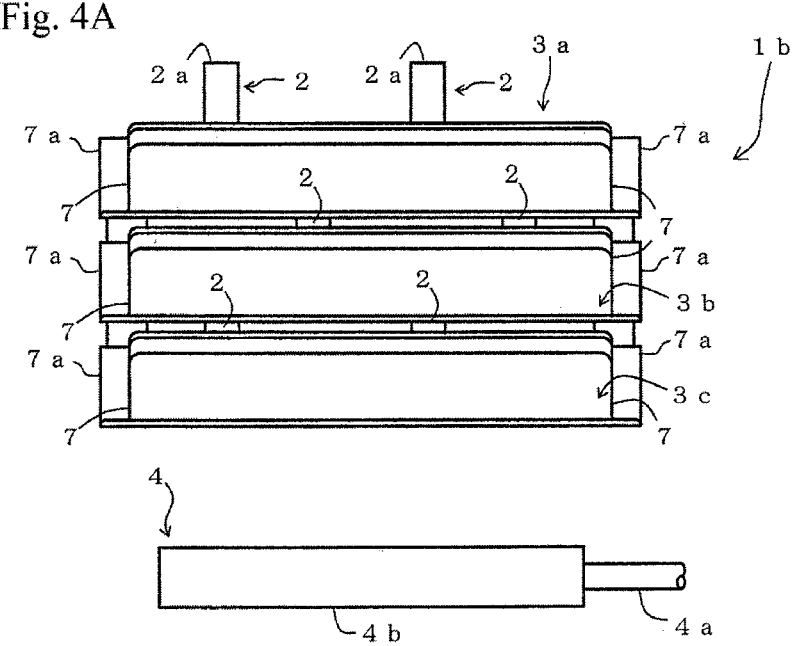
FIG. 4A is an external front view of a gas dissolution accelerating device according to a second embodiment of the present invention.
Figure 4B:
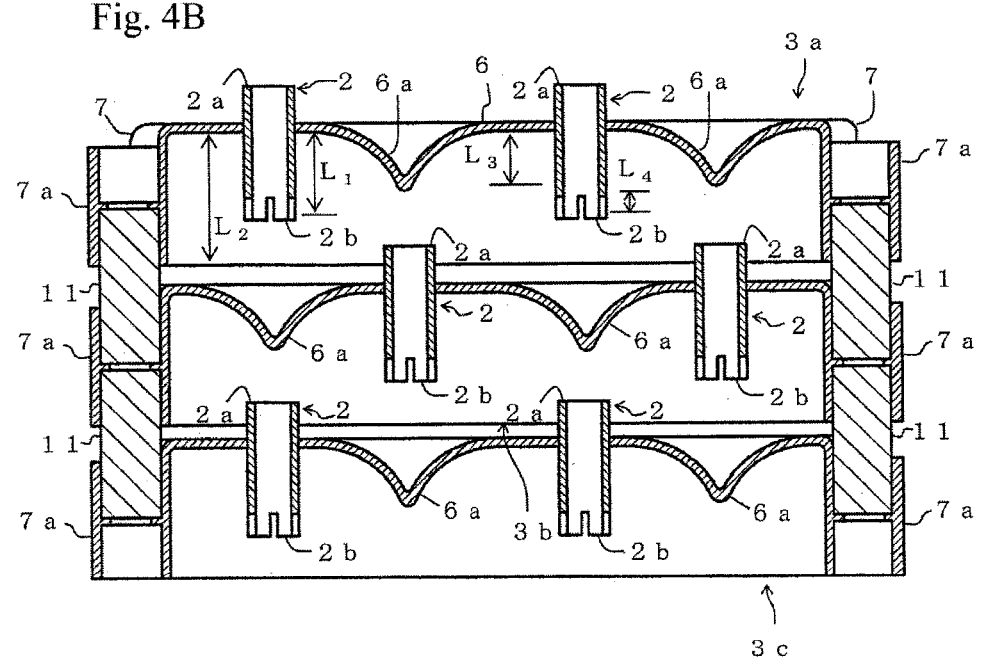
FIG. 4B is a longitudinal cross-sectional view of the gas dissolution accelerating device shown in FIG. 4A.
Figure 5:
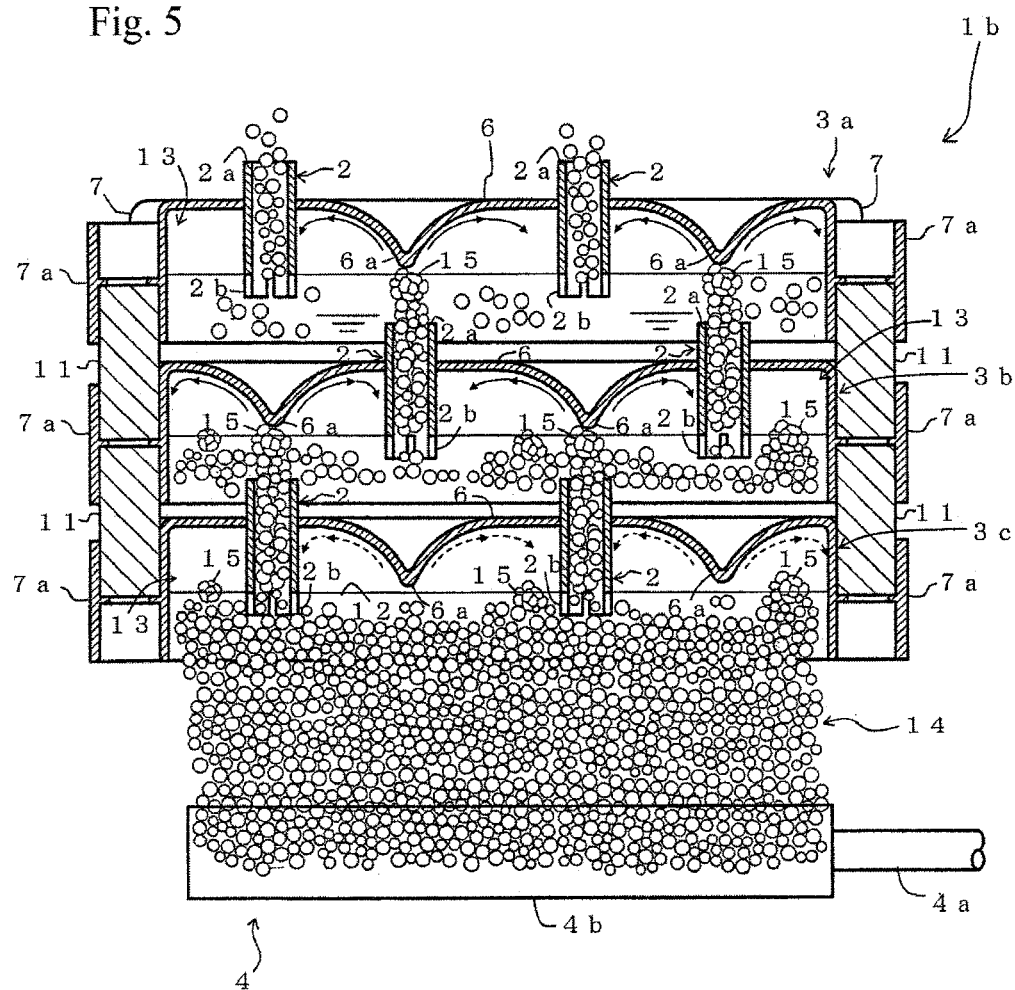
FIG. 5 is a diagram describing the movement of air bubbles in FIG. 4B.

FIG. 4A is an external front view of a gas dissolution accelerating device according to a second embodiment of the present invention. FIG. 4B is a cross-sectional view of the gas dissolution accelerating device shown in FIG. 4A taken along a vertical plane including the center in the width direction. FIG. 5 is a diagram describing the movement of air bubbles in FIG. 4B. FIG. 5 shows a box member in FIG. 4B that is installed in water. More specifically, FIGS. 4B and 5 respectively correspond to FIGS. 2C and 3A in the first embodiment.

In FIG. 4B, the diffuser is not shown. In FIGS. 4A and 5, the fixing unit is not shown. The same components in FIGS. 1 to 3B are given the same reference numerals and will not be described repeatedly.

As shown in FIGS. 4A and 4B, a gas dissolution accelerating device 1b includes three box members 3a to 3c each having the same structure as the box member 3 in the gas dissolution accelerating device 1a in the first embodiment. The box members 3a to 3c are stacked at intended intervals in the vertical direction and connected to one another with the connectors 11. The box member 3b is located below the box member 3a with the opening at the upper end 2a of each cylindrical member 2 located at the box member 3b immediately below the tip of the corresponding protrusion 6a in the box member 3a. Likewise, the box member 3c is located below the box member 3b with the opening at the upper end 2a of each cylindrical member 2 located at the box member 3c immediately below the tip of the corresponding protrusion 6a in the box member 3b.

In the present embodiment, the three box members 3a to 3c are provided. However, any number of box members may be used.

As shown in FIG. 5, in the gas dissolution accelerating device 1b with the above structure, clustered air bubbles 14 ascending through each cylindrical member 2 located at the box member 3c overflow the cylindrical member 2 through the upper end 2a, and are exposed to the gas in the gas phase 13 contained in the box member 3b and form liquid bubbles 15. The liquid bubbles 15 then collide with the tip of the corresponding protrusion 6a in the box member 3b and burst. Clustered air bubbles 14 ascending through each cylindrical member 2 located at the box member 3b overflow the cylindrical member 2 through the upper end 2a, and are exposed to the gas in the gas phase 13 contained in the box member 3a to form liquid bubbles. The liquid bubbles then collide with the tip of the corresponding protrusion 6a in the box member 3a and burst.

The cylindrical members 2 located at the box member 3c each gather air bubbles 14 reaching the lower end 2b and direct such air bubbles 14 immediately below the tip of the corresponding protrusion 6a in the box member 3b. Likewise, the cylindrical members 2 located at the box member 3b each gather air bubbles 14 reaching the lower end 2b and direct such air bubbles immediately below the tip of the corresponding protrusion 6a in the box member 3a.

In the gas dissolution accelerating device 1b, air bubbles 14 reaching the gas phase 13 form liquid bubbles 15 in the box members 3b and 3c as well, in addition to the box member 3a as described above. The liquid bubbles 15 then collide with the tips of the protrusions 6a and burst to form liquid films along the side surfaces of the protrusions 6a. More liquid bubbles 15 densely collide with the tips of the protrusions 6a in the box members 3a and 3b than the liquid bubbles 15 in the gas dissolution accelerating device 1a. Larger liquid films thus form after the burst of the liquid bubbles 15 than in the gas dissolution accelerating device 1a. In the box member 3c, liquid bubbles 15 collide with the tips of the protrusions 6a and burst to form thin liquid films along the side surfaces of the cone-shaped protrusions 6a as indicated by dashed arrows. In the box members 3a and 3b, larger liquid films than in the box member 3c form along the side surfaces of the cone-shaped protrusions 6a as indicated by solid arrows. The gas dissolution accelerating device 1b allows other gases dissolved in the liquid films to be exchanged with oxygen under their respective partial pressures, thus enhancing the effect of the gas dissolution accelerating device 1a.

In the gas dissolution accelerating device 1b, the cylindrical members 2 at least located at the box members 3b and 3c are each received in the through-hole 6b with the upper end 2a protruding upward from the top plate 6. The cylindrical members 2 located at the box member 3c thus each have the upper end 2a located adjacent to the tip of the corresponding protrusion 6a in the box member 3b, and the cylindrical members 2 located at the box member 3b each have the upper end 2a located adjacent to the tip of the corresponding protrusion 6a in the box member 3a. The cylindrical member 2 with the above arrangement gathers air bubbles 14 reaching the lower end 2b and directs the air bubbles 14 immediately below the tip of the corresponding protrusion 6a in the box member located above in a more reliable manner than the cylindrical member 2 with the upper end 2a not protruding upward from the top plate 6.

When the cylindrical members 2 located at the box members 3b and 3c each have the upper end 2a placed in the gas phase 13 inside the box member 3a or 3b, air bubbles 14 fed through the upper end 2a of each cylindrical member 2 located at the box members 3b and 3c can entrain less water. The air bubbles 14, which form liquid bubbles, are thus less likely to form larger liquid films after colliding with the tip of the corresponding protrusion 6a in the box members 3a and 3b and bursting.

In the gas dissolution accelerating device 1b, however, each cylindrical member 2 located at the box members 3b and 3c has the upper end 2a located below the lower ends 2b of the cylindrical members 2 located at the box members 3a and 3b (refer to FIG. 4B). Each cylindrical member 2 located at the box members 3b and 3c thus has the upper end 2a located below the interface 12 at the level of the slits 2d on the cylindrical members 2 when no more gas can be stored in the box members 3a and 3b.

In the gas dissolution accelerating device 1b, as shown in FIG. 5, air bubbles 14 overflowing the cylindrical members 2 located at the box members 3b and 3c through the upper ends 2a forcefully ascend in the liquid phase while entraining a large amount of surrounding water when the gas is excessively supplied from the diffuser 4 to the box members 3a to 3c beyond their allowable capacity. The air bubbles 14 then form liquid bubbles in the gas phase 13 and forcefully collide with the tips of the protrusions 6a in the box members 3a and 3b. This forms larger, thin liquid films along the side surfaces of the cone-shaped protrusions 6a in the box members 3a and 3b.

For the cylindrical member 2 with the slits 2d on the side surface as described in the present embodiment, the cylindrical members 2 located at the box members 3b and 3c may each have the upper end 2a located below the uppermost ends of the slits 2d on the cylindrical members 2 located at the box members 3a and 3b.

In addition, the cylindrical members 2 located at the box members 3a to 3c in the gas dissolution accelerating device 1b have the slits 2d on the side surfaces. The gas dissolution accelerating device 1b thus has the same effect as the gas dissolution accelerating device 1a described with reference to FIG. 3B in the first embodiment. More specifically, in the gas dissolution accelerating device 1b, air bubbles 14 excessively supplied from the diffuser 4 to the box members 3a to 3c are less likely to intensely agitate the interfaces 12 up and down. The air bubbles 14 thus smoothly flow into the cylindrical members 2, and then continuously overflow the cylindrical members 2 located at the box members 3b and 3c through the upper ends 2a to form liquid bubbles and constantly collide with the tips of the protrusions 6a in the box members 3a and 3b. This facilitates the liquid bubbles 15 to form thin liquid films along the side surfaces of the protrusions 6a when the liquid bubbles 15 collide with the tips of the protrusions 6a in, in particular, the box members 3a and 3b in the gas dissolution accelerating device 1b. The dissolved oxygen concentrations in water are thus increased more efficiently.

The present invention is applicable to efficient dissolution of a target gas not limited to oxygen in a target liquid.

REFERENCE SIGNS LIST 1a gas dissolution accelerating device
1b gas dissolution accelerating device
2 cylindrical member
2a upper end
2b lower end
2c side surface
2d slit
3 box member
3a box member
3b box member
3c box member
4 diffuser
4a feeding pipe
4b porous diffusing cylinder
5 fixing unit
6 top plate
6a protrusion
6b through-hole
7 side plate
7a holder
7b edge
7c screw hole
8 attachment plate
8a upper surface
9 banding member
10 connecting member
11 connector
12 interface
13 gas phase
14 air bubble
15 liquid bubble

The invention claimed is:

1. A gas dissolution accelerating device to be installed above a diffuser, the device comprising:
   a box member having an opening facing downward when installed and including a top plate with a through-hole; and
   a cylindrical member located parallel to a vertical direction when installed,
   wherein the cylindrical member is received in the through-hole with a length extending downward from the top plate falling within a depth of the box member, and
   the box member has, at a position excluding the through-hole in the top plate, a conical protrusion protruding downward from the top plate, and the protrusion has a width in a longitudinal cross section gradually reducing toward an apex and a concavely curved side surface, and has a height falling within the length of the cylindrical member extending downward from the top plate.

2. A gas dissolution accelerating device to be installed above a diffuser, the device comprising:
   a first box member having a first opening facing downward when installed and including a first top plate with a first through-hole;

a first cylindrical member located parallel to a vertical direction when installed;

a second box member having a second opening facing downward when installed and including a second top plate with a second through-hole; and a second cylindrical member located parallel to the vertical direction when installed, wherein the first cylindrical member is received in the first through-hole with a length extending downward from the first top plate falling within a depth of the first box member, the second cylindrical member is received in the second through-hole with a length extending downward from the second top plate falling within a depth of the second box member, the first box member has, at a position excluding the first through-hole in the first top plate, a first conical protrusion protruding downward from the first top plate, and the first protrusion has a width in a longitudinal cross section gradually reducing toward an apex and a concavely curved side surface, and has a height falling within the length of the first cylindrical member extending downward from the first top plate, and the second box member has, at a position excluding the second through-hole in the second top plate, a second conical protrusion protruding downward from the second top plate, and the second protrusion has a width in a longitudinal cross section gradually reducing toward an apex and a concavely curved side surface, and has a height falling within the length of the second cylindrical member extending downward from the second top plate, and the second box member is located below the first box member with an upper end of an opening of the second cylindrical member located immediately below a tip of the first protrusion in the first box member.

3. The gas dissolution accelerating device according to claim 2, wherein
the second cylindrical member located at the second box member is received in the second through-hole with the upper end protruding upward from the second top plate.

4. The gas dissolution accelerating device according to claim 3, wherein
the second cylindrical member located at the second box member is received in the second through-hole in the second top plate with the upper end located below a lower end of the first cylindrical member located at the first box member.

5. The gas dissolution accelerating device according to claim 2, further comprising:
rod-shaped connectors,
wherein the first box member and the second box member each have holders on side plates opposing each other, and each of the holders receives an upper end of one of the connectors and/or a lower end of another one of the connectors.

6. The gas dissolution accelerating device according to claim 2, wherein
the second cylindrical member located at the second box member has a slit on a side surface and received in the second through-hole in the second top plate with an uppermost end of the slit located below a tip of the second protrusion in the second box member.

7. The gas dissolution accelerating device according to claim 3, further comprising:
rod-shaped connectors,
wherein the first box member and the second box member each have holders on side plates opposing each other, and each of the holders receives an upper end of one of the connectors and/or a lower end of another one of the connectors.

8. The gas dissolution accelerating device according to claim 4, further comprising:
rod-shaped connectors,
wherein the first box member and the second box member each have holders on side plates opposing each other, and each of the holders receives an upper end of one of the connectors and/or a lower end of another one of the connectors.

9. The gas dissolution accelerating device according to claim 3, wherein
the second cylindrical member located at the second box member has a slit on a side surface and received in the second through-hole in the second top plate with an uppermost end of the slit located below a tip of the second protrusion in the second box member.

10. The gas dissolution accelerating device according to claim 4, wherein
the second cylindrical member located at the second box member has a slit on a side surface and received in the second through-hole in the second top plate with an uppermost end of the slit located below a tip of the second protrusion in the second box member.

11. The gas dissolution accelerating device according to claim 5, wherein
the second cylindrical member located at the second box member has a slit on a side surface and received in the second through-hole in the second top plate with an uppermost end of the slit located below a tip of the second protrusion in the second box member.

12. The gas dissolution accelerating device according to claim 7, wherein
the second cylindrical member located at the second box member has a slit on a side surface and received in the second through-hole in the second top plate with an uppermost end of the slit located below a tip of the second protrusion in the second box member.

13. The gas dissolution accelerating device according to claim 8, wherein
the second cylindrical member located at the second box member has a slit on a side surface and received in the second through-hole in the second top plate with an uppermost end of the slit located below a tip of the second protrusion in the second box member.

* * * * *